United States Patent [19]
Matsunaga et al.

[11] Patent Number: 6,037,025
[45] Date of Patent: Mar. 14, 2000

[54] REINFORCED RUBBER HOSE

[75] Inventors: Shinji Matsunaga, Seto; Koichi Tangiku, Aichi; Atsushi Suzuki, Inazawa, all of Japan

[73] Assignee: Toyoda Gosei Co., Ltd., Aichi, Japan

[21] Appl. No.: 08/953,485

[22] Filed: Oct. 17, 1997

[30] Foreign Application Priority Data

Oct. 18, 1996 [JP] Japan ................................ 8-276524

[51] Int. Cl.$^7$ .............................. B32B 1/08; B32B 7/00; F16L 11/04
[52] U.S. Cl. ...................... 428/36.91; 138/126; 138/141; 138/153; 428/36.1; 428/36.3; 428/36.8; 428/519; 428/520; 428/521; 428/522
[58] Field of Search ................... 428/36.8, 36.91, 428/36.1, 36.3, 519, 520, 521, 522, 330, 331; 138/126, 141, 153; 525/233, 238, 332.7; 524/451

[56] References Cited

U.S. PATENT DOCUMENTS

| | | | |
|---|---|---|---|
| 3,627,723 | 12/1971 | Kealy et al. | 260/41.5 R |
| 4,905,735 | 3/1990 | Akiyoshi | 428/36.8 |
| 4,910,267 | 3/1990 | Oyama et al. | 525/325 |
| 5,569,716 | 10/1996 | Okamoto et al. | 525/192 |
| 5,795,635 | 8/1998 | Iwasaki | 428/36.3 |

FOREIGN PATENT DOCUMENTS

| | | |
|---|---|---|
| 3245468 | 7/1983 | Germany . |
| 63-167187 | 7/1988 | Japan . |
| 01178539A | 7/1989 | Japan . |

*Primary Examiner*—Ellis Robinson
*Assistant Examiner*—Sandra M. Nolan
*Attorney, Agent, or Firm*—Pillsbury Madison & Sutro Intellectual Property Group

[57] ABSTRACT

A reinforced rubber hose including an inner tube and a reinforcing yarn layer externally contacting the inner tube. The inner tube includes at least an inner-tube inside layer and an inner-tube outside layer, the inner-tube outside layer being formed of a vulcanized diene rubber composition, the inner-tube inside layer being formed of a vulcanized hydrogenated nitrile rubber composition. Both the diene rubber compound and the hydrogenated nitrile rubber composition are vulcanized by a sulfur vulcanization agent. Further, the diene rubber composition contains about 5 to 25 phr of talc, wherein the talc has an average particle diameter of about 1 to 5 μm and an aspect ratio of about 5 to 20.

20 Claims, 1 Drawing Sheet

REINFORCED RUBBER HOSE

BACKGROUND OF THE INVENTION

1. Field of the Invention

The present invention relates to a reinforced rubber hose, and in particular, to a reinforced hose such as, for example, a power steering hose, which is exposed to high-temperatures and which requires resistance to oil, such as mineral oil, or, similarly, for example, a reinforced hydraulic hose, used for conducting a vegetable oil, such as palm or coconut oil.

Although a power steering hose with a basic configuration of an inner tube 11, a reinforcing yarn layer 13 and an outer tube 15, as shown in FIG. 1, is the primary model described herein by way of example, the present invention is not limited to this configuration, but is also applicable, for example, to a reinforced rubber hose with a plurality of reinforcing yarn layers or with three or more rubber layers, while lacking an outer tube.

Abbreviations of rubber polymers used in this specification are defined below.

NBR . . . nitrile rubber
hydro-NBR . . . hydrogenated nitrile rubber
CSM . . . chlorosulfonic polyethylene
CR . . . polychloroprene rubber
EPDM . . . ethylene-propylene-diene rubber
phr . . . parts per hundred parts of rubber, used for abbreviating a weight unit, otherwise known as a compounding unit, unless otherwise specified.

2. Description of the Related Art

A conventional hose comprises, for example, an inner tube, a reinforcing yarn layer contacting the outer surface of the inner tube, and, usually, an outer tube. The inner tube is formed of a vulcanized NBR rubber compound, the reinforcing yarn layer is formed of 6,6-nylon yarn (polyamide fiber), and the outer tube is formed of a vulcanized CSM rubber compound.

Recent demands for high speed performance of passenger cars have been met at the expense of generating high-temperatures in engine compartments, necessitating the creation of higher heat-resistant and oil-resistant reinforced power steering hoses.

In order to meet this need, hoses comprising an inner tube formed of a double-layer structure, having an inner-tube inside layer of a vulcanized hydro-NBR rubber compound and an inner-tube outside layer of a vulcanized rubber compound, such as NBR or similar compound characterized by superior heat resistance, are used in automobile engines. However, it is necessary to use hydro-NBR with hydrogenation of about 83% or more in order to ensure oil resistance and heat resistance. When such a hydro-NBR rubber compound is bonded with non-hydrogenated NBR by vulcanization with a sulfur agent, it is difficult to obtain sufficient bonding force, because the crosslinking points of sulfur vulcanization are reduced with increasing ratios of hydrogenation.

Japanese Patent Publication No. Hei. 6-86915 discloses a technique in which, usually, both the hydro-NBR compound forming the inner-tube inside layer and the NBR compound forming the inner-tube outside layer are made to be a peroxide vulcanization group, and, in addition, triazine or the like is added to the NBR compound in order to ensure adhesion to the reinforcing fiber layer. However, this technique teaches the blending of sulfur, triazine or other vulcanizing agents, in addition to organic peroxide, in the NBR rubber compound of the inner-tube outside layer. The result is a complex compound requiring strict control of the vulcanization temperature and time during its production. In addition, because both the rubber compound (NBR rubber compound) forming the inner-tube outside layer and the rubber compound (hydro-NBR rubber compound) forming the inner-tube inside layer are synthesized by vulcanization with organic peroxide, the rubbers require careful handling and strict control of the vulcanizing process. This is because the organic peroxide vulcanization agents have a higher reactivity than sulfur vulcanization agents, and therefore must be protected from exposure to heat, sunlight, and the like.

SUMMARY OF THE INVENTION

It is, therefore, an object of the present invention to overcome the foregoing problem by providing a reinforced rubber hose in which an inner-tube outside layer is formed from a first composition comprising a vulcanized diene rubber composition while an inner-tube inside layer is formed from a second composition comprising a vulcanized hydro-NBR rubber composition, and in which superior adhesion can be obtained between the inner-tube outside layer and the inner-tube inside layer as a result of both the rubber compounds of the diene rubber and the hydro-NBR having been subjected to simple sulfur vulcanization.

Therefore, according to the present invention, a reinforced rubber hose is provided that comprises an inner tube including an inner-tube inside layer formed of a vulcanized hydrogenated nitrile rubber composition and an inner-tube outside layer formed of a vulcanized diene rubber composition, and a reinforcing yarn layer externally contacting an outer surface of the inner-tube outside layer of the inner tube. The diene rubber composition and the hydrogenated nitrile rubber compound are vulcanized by sulfur vulcanization agents.

The diene rubber composition also contains talc in a range of from about 5 phr to about 25 phr. The average particle size of the talc is about 1 $\mu$m to about 5 $\mu$m and an aspect ratio of the talc is about 5 to about 20.

As referred to herein, a vulcanized diene rubber composition is a compound obtained by vulcanizing a diene rubber.

As referred to herein, a vulcanized hydrogenated nitrile rubber is a compound obtained by vulcanizing a hydrogenated nitrile rubber.

These and other objects, features, and advantages of the present invention will become apparent from the following detailed description when taken in conjunction with the accompanying drawings which illustrate, by way of example, the principles of the present invention.

DETAILED DESCRIPTION OF THE PREFERRED EMBODIMENTS

The configuration of the present invention is described in detail below. Parts the same as those in the conventional example are referenced accordingly, and thus descriptions thereof are not repeated below.

Figure 1:
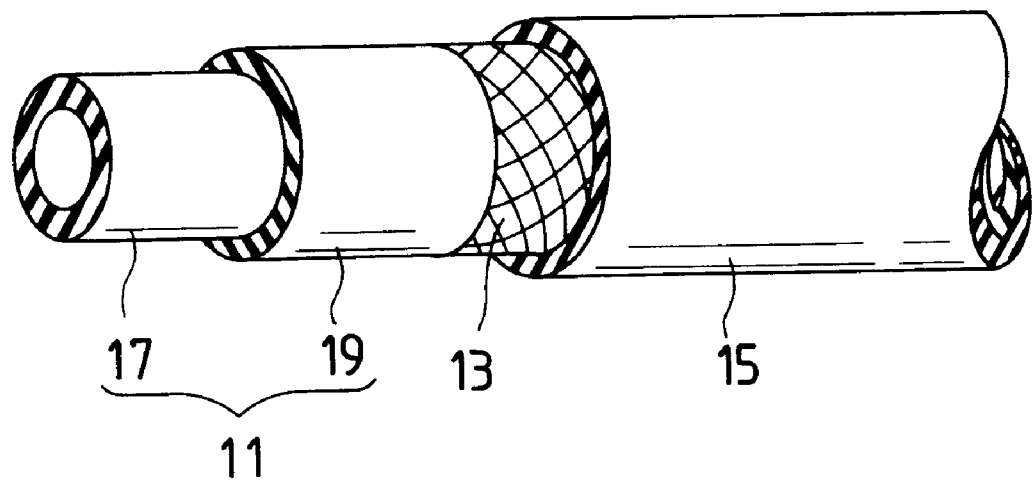
FIG. 1 is a partially exposed view illustrating a configuration of a reinforced rubber hose in accordance with an embodiment of the present invention.

A reinforced rubber hose according to one embodiment of the present invention includes an inner tube 11 and a reinforcing yarn layer 13 contacting the outer surface (unnumbered) of the inner tube 11, as shown in FIG. 1. The inner tube 11 comprises an inner-tube inside layer 17 and an inner-tube outside layer 19. The inner-tube outside layer 19 is formed of at least one vulcanized diene rubber composition, while the inner-tube inside layer 17 is formed of at least one vulcanized hydro-NBR composition.

The thickness of the inner tube 11, the inside layer 17 and the outside layer 19 can be selected within the ranges of from 0.3 mm to 0.7 mm, from 0.9 mm to 1.3 mm and from 1.4 mm to 1.8 mm, respectively.

Examples of the diene rubber include NBR, butadiene rubber (BR), styrene-butadiene rubber (SBR), isoprene rubber (IR), chloroprene rubber (CR),and the like. NBR is preferred, in view of its heat resistance and adhesion to the inner-tube inside layer.

The hydrogenation percentage of the hydro-NBR is usually selected within the range of from 83 to 97%, preferably 87 to 93%, wherein the percentage is defined as the number of single carbon bonds (C—C) post hydrogenation/the sum number of single (C—C) and double (C═C) carbon bonds prior to hydrogenation. If the hydrogenation percentage is too low, it is difficult to obtain oil resistance and heat resistance in the inner-tube inside layer, whereas if the hydrogenation ratio is too high, it is difficult to obtain a predetermined crosslinking density of sulfur vulcanization. Compression set resistance in the inner layer is difficult to ensure as a result, and it is likewise arduous to obtain a sufficient crosslinking density between the inner layer and the outer layer, thereby creating impediments to ensuring adhesive strength to the outer layer.

The diene rubber composition and the hydro-NBR rubber composition comprise first and second sulfur vulcanization agents, respectively. The working concentrations of sulfur are usually selected to be in a range of from about 0.1 phr to about 3 phr, preferably from 0.2 phr to 1 phr.

The sulfur vulcanization agent comprises sulfur, a vulcanization activator (zinc white or stearic acid), and optionally, added independently or together, a vulcanization accelerator and an antiscorching agent. The vulcanization accelerator is selected from the group consisting of sulfonamides, thiurams and thiazoles, and are used singly or in combination. Preferably, the vulcanization accelerator contains an antiscorching agent, the presence of which improves the adhesion between the rubber layers (compare Comparative examples 3 and 4 and Comparative examples 5 and 6). Antiscorching agents may be selected from the group consisting of organic acids or nitroso compounds, preferably the organic acids phthalic anhydride, salicylic acid or benzoic acid, or the nitroso compounds N-nitrosodiphenylamine, N-(cyclohexylthio)-phthalimide, sulphoneamide derivatives, diphenylurea, or the like.

The diene rubber composition contains about 5 phr to about 25 phr of talc. If the content of talc is too small, the blending of talc fails to improve adhesion between the inner layer and the outer layer. Conversely, when the talc content is too large, permanent strain resistance is reduced (see the columns of compression set ratio of NBR(a), (b), (c) and (d) in Table 1).

Suitable talc has an average particle size in a range of from about 1 μm to about 5 μm (preferably about 1.5 μm to about 3.5 μm), and an aspect ratio of about 5 to about 20 (preferably about 7 to about 13). In either case, if the average particle size of the talc is less than about 1 μm, or the aspect ratio of the talc is less than about 5, difficulty arises in obtaining a predetermined effect of improving adhesion.

Figure 2:
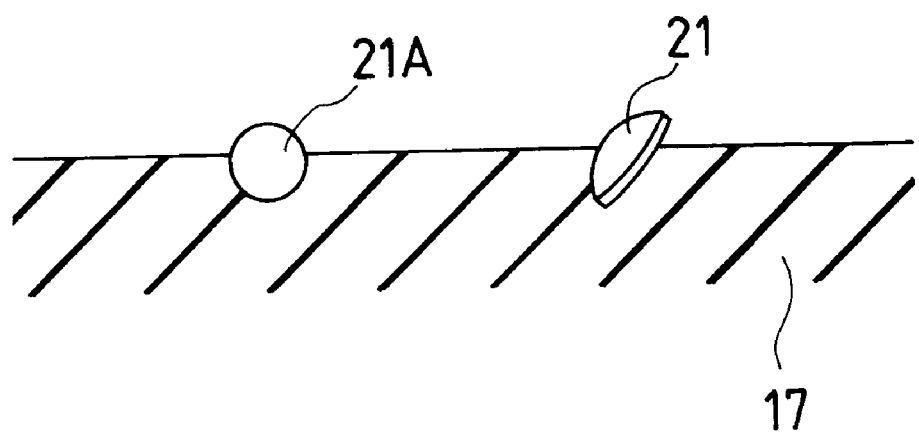
FIG. 2 is a model diagram illustrating the operation of talc in the interface of an inner-tube outside layer.

The blending of talc promotes an anchoring effect of the talc at the interface of the inner-tube outside layer (diene rubber layer) 19 with the inner-tube inside layer (hydro-NBR layer), thereby increasing adhesion, as shown in FIG. 2. Accordingly, the larger the average particle size and the aspect ratio of the talc, the larger the anchoring effect. Thus, square talc 21 with a large aspect ratio has an anchoring effect larger than spherical talc 21A. On the other hand, when the average particle size and the aspect ratio of the talc are too large, workability problems arise while mixing rubber composition, such as uneven dispersion of the talc throughout the mixture, resulting in inconsistent improvements in adhesion between the inner layer and the outer layer.

It is preferable that the hydro-NBR compound contain about 1 phr to about 15 phr (preferably 3 phr to 10 phr) of talc to improve the interlaminar adhesion and the oil resistance.

If the loading amounts of the talc are less than about 1 phr, it is difficult to have the talc blending-mediated improvements in interlaminar adhesion and oil resistance. If they are above about 15 phr, the solid state strength properties of the vulcanized hydro-NBR are reduced.

A sulfur vulcanization agent, such as sulfur or a similar compound, and a vulcanization accelerator, talc in the case of diene rubber, carbon black, zinc white, a processing aid, an antioxidant agent or the like, and other auxiliary materials are added to rubber compositions of hydro-NBR and diene rubber, and then kneaded and partially outputted, thereby preparing rubber materials for extrusion molding of a hose.

The vulcanization accelerator for hydro-NBR rubber may be selected from the group consisting of thiurams, preferably tetraethylthiuram disulfide or tetrethylthiuram monosulfide, or thiazoles, preferably 2-mercaptobenzothiazole. The NBR rubber vulcanization accelerator may be selected from the group consisting of thiurams, preferably trimethylthiuram disulfide, or sulfenamides, preferably N-oxydiethylene 2-benzothiazole.

The processing aid for hydro-NBR rubber may be a rosin derivative, preferably a hydrogenated rosin ester. For NBR rubber, the processing aid may be an adipic acid derivative, preferably dibutyl diglycol adipate.

The antioxidant for hydro-NBR rubber may be a quinoline, preferably polymerized trimethyl dihydroquinoline. The antioxidant for NBR rubber may be selected from the group consisting of p-phenylenediamines or benzimidazoles, preferably N, N'-naphthyl p-phenylenediamene or 2-mercaptomethyl benzimidazole.

Using the prepared rubber materials, the inner-tube inside layer 17 and the inner-tube outside layer 19 are extruded, usually by using a double-layer extruder, after which the reinforcing yarn layer 13 is formed by braiding nylon yarn or the like. Following the application of a bonding agent to layers 17 and 19, the outer tube 15 is extruded thereon.

The rubber material of the outer tube is not limited, but may be, for example, selected from the group consisting of synthetic rubber compounds with superior weatherproof characteristics, such as CSM, CR, EPDM, etc. Of these, chlorinated rubber, such as CSM, CR, etc., are preferred, due to improved adhesion to the reinforcing yarn layer.

The reinforced rubber hose thus manufactured is superior not only in interlaminar adhesion between hydro-NBR and diene rubber, but also in resistance to both heat aging and oil resistance, as shown by the experimental examples.

Having the above-mentioned configuration, the reinforced rubber hose according to the present invention has the following operation and effects.

(1) The diene rubber composition forming the inner-tube outside layer and the hydro-NBR composition forming the inner-tube inside layer are vulcanized by a sulfur vulcanization agent, wherein the diene rubber composition is made to contain about 5 phr to about 25 phr of talc. The talc is selected from a group characterized by an average particle size of about 1 μm to about 5 μm and an aspect ratio of about 5 to about 20. Accordingly, it is possible to obtain adhesion with practical strength between the inner-tube inside layer and the inner-tube outside layer (the hydro-NBR layer and the diene rubber layer).

Therefore, since the primary component of the vulcanization agent is sulfur or a sulfur compound, and since organic peroxide is not required, it is not necessary to strictly control the vulcanization temperature, time, and so on, unlike the conventional technique. The vulcanization agent is also easy to handle. Another advantage of the sulfur vulcanization agent is the ease of ensure adhesion to the reinforcing yarn layer, as compared with an organic peroxide vulcanization agent.

(2) The hydrogenation percentage of the hydro-NBR is selected from within the range of from 83 to 97%. Accordingly, not only it is possible to give predetermined oil resistance and heat resistance to the inner-tube inside layer, but also it is possible to ensure sufficient adhesion between the inner-tube inside layer and the inner-tube outside layer.

(3) The diene rubber of the inner-tube outside layer is selected to be an NBR similar to hydro-NBR. Thus it is possible to ensure both sufficient adhesion to the inner-tube inside layer formed of hydro-NBR and adequate heat resistance of the inner tube as a whole.

(4) The outer tube is formed of chlorinated rubber, and the chlorinated rubber is superior in heat resistance and adhesion to the reinforcing yarn layer.

Accordingly, together with the above-mentioned operation and effects (1) to (4), it is possible to provide a heat-resistant and durable reinforced hose, superior in compression set resistance, oil resistance, and flex cracking resistance in a high-temperature environment, when the present invention is applied to a reinforced hose for actuating mineral oil, such as a power steering hose exposed to the high-temperatures of, for example, an automobile.

EXAMPLES

Testing examples performed to confirm the effects of the present invention are described below.

(A) Testing Method

Testing of solid state properties of the following items was performed by using rubber compound materials obtained by the preparation according to the blending formulation shown in Table 1. The acrylonitrile content of the hydro-NBR and NBR rubbers in 36 wt. % and 28 wt %, respectively. Both raw rubbers were obtained from Nippon Zeon Co., Ltd.

TABLE 1

|  | hydro-NBR (1) | hydro-NBR (2) | NBR (a) | NBR (b) | NBR (c) | NBR (d) |
|---|---|---|---|---|---|---|
| raw rubber | 100 | 100 | 100 | 100 | 100 | 100 |
| SRF carbon | 55 | 95 | 52 | 58 | 55 | 55 |
| talc *1) | — | — | 15 | — | 30 | 30 |
| antiaging agent | 2 | 2 | 2.5 | 2.5 | 2.5 | 3 |
| stearic acid | 1 | 1 | 1 | 1 | 1 | 1 |
| zinc white | 5 | 5 | 5 | 5 | 5 | 5 |
| processing aid | 5 | 5 | 2 | 2 | 3 | 3 |

TABLE 1-continued

|  | hydro-NBR (1) | hydro-NBR (2) | NBR (a) | NBR (b) | NBR (c) | NBR (d) |
|---|---|---|---|---|---|---|
| sulfur | 0.5 | 0.5 | 0.5 | 0.5 | 0.5 | 0.3 |
| vulcanization-accelerator | 3.5 | 3.5 | 3.5 | 3 | 3 | 4 |
| antiscorching agent | — | — | 0.5 | 0.5 | 0.5 | — |
| compression set ratio (120° C. × 70 h) | — | — | 26% | 20% | 36% | 34% |

*1) "Mystron Paper" (made by Nihon Mystron Co., Ltd.) average particle size: 2.3 μm, aspect ratio:10.0

TABLE 2

|  |  |  | adhesion strength | |
|---|---|---|---|---|
|  | hydro-NBR | NBR | room temperature | 100° C. |
| Example 1 | (1) | (a) | 73 | 9 |
| Example 2 | (2) | (a) | 74 | 7 |
| Comparative Example 1 | (1) | (b) | 42 | 8 |
| Comparative Example 2 | (2) | (b) | 47 | 6 |
| Comparative Example 3 | (1) | (c) | 40 | 7 |
| Comparative Example 4 | (2) | (c) | 42 | 6 |
| Comparative Example 5 | (1) | (d) | 30 | 3 |
| Comparative Example 6 | (2) | (d) | 36 | 3 |

(1) Adhesion Test 2 mm thick sheets of the respectively shown hydro-NBR and non-vulcanized general-use NBR were pasted on each other, and press vulcanization was performed thereon for 15 min at 165° C. Next, respective test pieces were prepared by cutting the sheets into sections 10 mm wide and 100 mm long. A 180° adhesion test was performed on the respective test pieces under the given temperature at 50 mm/min to thereby measure adhesion strength (N/cm).

(2) Compression Set Test

A compression set test in accordance with JIS K 6301 was performed in the thermal treatment conditions of 70 h at 120° C to thereby obtain a compression set ratio CS (%)

(B) Test Result (1) Table 2 shows the results of adhesion test. The experimental data for the respective examples according to the present invention exhibit superior adhesion between the hydro-NBR layer and the diene rubber layer (NBR layer), particularly at room temperature. The results demonstrate reduced adhesion in the presence of excessive talc (see Comparative examples 3 to 6).

(2) Table 1 displays the compression set test results. The data show essentially a direct proportionality between the loading amounts of talc and the ratio of compression set, whereby the compression set resistance is reduced upon increasing loading amounts of talc.

A reinforced ribbon hose is disclosed in application No. 8/276524 filed in Japan on Oct. 18, 1996, the complete disclosure of which is incorporated herein by reference.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A reinforced vulcanized rubber hose comprising:

an inner tube comprising an inner-tube inside layer and an inner-tube outside layer; and a reinforcing yarn layer contacting an external surface of said inner-tube outside layer;

wherein said inner-tube outside layer comprises talc and a vulcanized diene rubber composition vulcanized by a first sulfur vulcanization agent, said talc being present in a range of from about 5 phr to 25 phr and having an average particle size in a range of from about 1 μm to 5 μm and an aspect ratio in a range from about 5 to 20, and wherein said inner-tube inside layer comprises a vulcanized hydrogenated nitrile rubber composition vulcanized by a second sulfur vulcanization agent.

2. The reinforced rubber hose according to claim 1, wherein the hydrogenation percentage of hydrogenated nitrile rubber composition is present in the range of from about 83 to 97%.

3. The reinforced rubber hose according to claim 1, wherein said diene rubber composition comprises a nitrile rubber.

4. The reinforced hose according to claim 1, wherein said first and second sulfur vulcanization agents contain sulfur in an amount in the range of from about 0.1 phr to 3 phr.

5. The reinforced rubber hose according to claim 4, wherein said sulfur vulcanization agent for the hydrogenated nitrile rubber composition comprises a vulcanization accelerator selected from the group consisting of thiurams and thiazoles.

6. The reinforced rubber hose according to claim 4, wherein said sulfur vulcanization agent for the hydrogenated nitrile composition comprises a vulcanization accelerator selected from the group consisting of tetraethylthiuram disulfide, tetraethyl-thiuram monosulfide and 2-mercaptobenzothiazole.

7. The reinforced rubber hose according to claim 4, wherein said sulfur vulcanization agent for the diene rubber composition comprises a vulcanization accelerator selected from the group consisting of thiurams and sulfenamides.

8. The reinforced rubber hose according to claim 4, wherein said sulfur vulcanization agent for the diene rubber composition comprises a vulcanization accelerator selected from the group consisting of trimethylthiuram disulfide and N-oxydiethylene 2-benzothiazole.

9. The reinforced rubber hose according to claim 7 or claim 8, wherein the vulcanization accelerator contains an anti-scorching agent selected from the group consisting of organic acids and nitroso compounds.

10. The reinforced rubber hose according to claim 4, wherein said reinforced rubber hose further comprises a polymerized trimethyl dihydroquinoline antioxidant for the hydrogenated nitrile rubber composition.

11. The reinforced rubber hose according to claim 4, wherein said reinforced rubber hose further comprises an antioxidant for the diene rubber composition, which antioxidant is selected from the group consisting of N, N'-naphthyl p-phenylenediamine and 2-mercaptomethyl benzimidazole.

12. The reinforced rubber hose according to claim 4, wherein said reinforced rubber hose further comprises a hydrogenated rosin ester processing aid for the hydrogenated nitrile rubber composition.

13. The reinforced rubber hose according to claim 4, wherein said reinforced rubber hose further comprises dibutyl diglycol adipate as a processing aid for the diene rubber compound.

14. The reinforced rubber hose according to claim 1, wherein said hydrogenated nitrile rubber composition also contains talc in a range of from about 1 phr to 15 phr.

15. The reinforced rubber hose according to claim 1, further comprising an outer tube which is formed of a vulcanized chlorinated rubber compound.

16. The reinforced rubber hose according to claim 2, further comprising an outer tube which is formed of a vulcanized chlorinated rubber compound.

17. The reinforced rubber hose according to claim 3, further comprising an outer tube which is formed of a vulcanized chlorinated rubber compound.

18. The reinforced rubber hose according to claim 4, further comprising an outer tube which is formed of a vulcanized chlorinated rubber compound.

19. The reinforced rubber hose according to claim 14, further comprising an outer tube which is formed of a vulcanized chlorinated rubber compound.

20. The reinforced rubber hose according to claim 9, wherein the anti-scorching agent is a member selected from the group consisting of phthalic anhydride, salicylic acid, benzoic acid, N-nitrosodiphenylamine, N-(cyclohexyl-thio)-phthalimide and sulphoneamide derivatives.

* * * * *